Figures 1, 2:
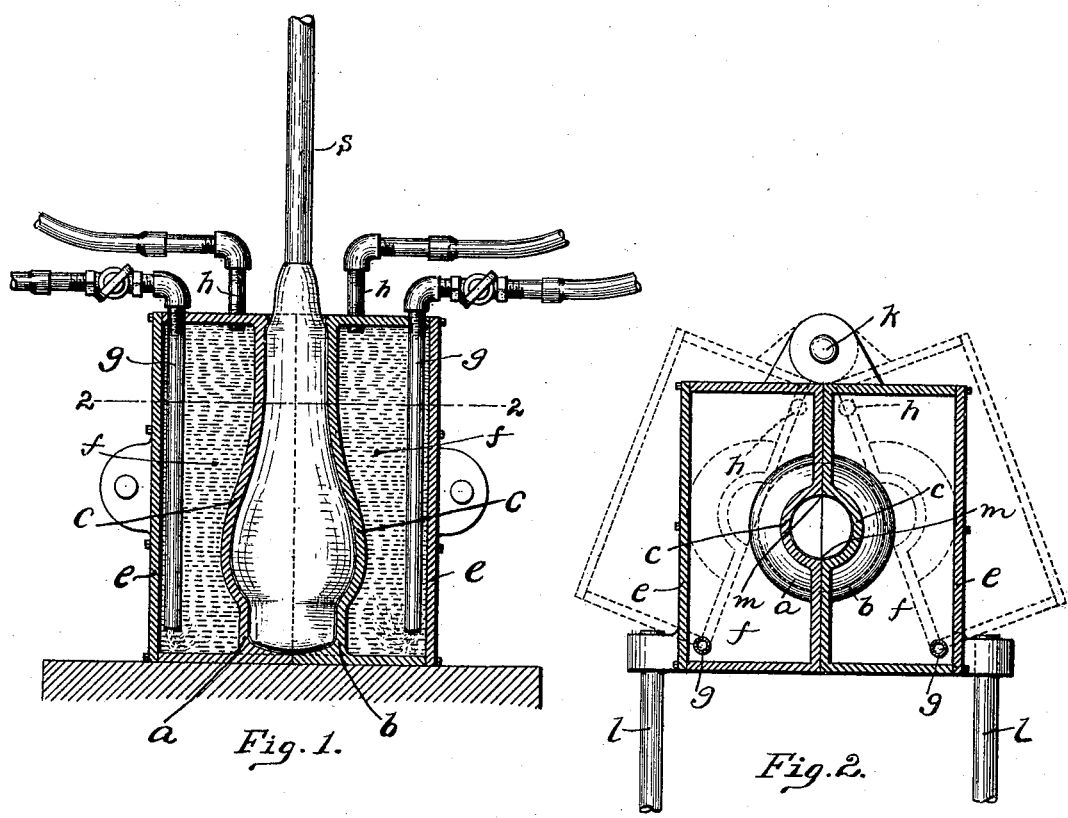

No. 615,910. Patented Dec. 13, 1898.
C. Z. F. ROTT & T. C. STEIMER.
GLASS MOLD.
(Application filed June 7, 1898.)
(No Model.)

Witnesses: Inventors.

UNITED STATES PATENT OFFICE.

CHRISTIAN Z. F. ROTT, OF PITTSBURG, AND THEODORE C. STEIMER, OF CHARLEROI, PENNSYLVANIA; SAID STEIMER ASSIGNOR TO SAID ROTT.

GLASS-MOLD.

SPECIFICATION forming part of Letters Patent No. 615,910, dated December 13, 1898.

Application filed June 7, 1898. Serial No. 682,828. (No model.)

*To all whom it may concern:*

Be it known that we, CHRISTIAN Z. F. ROTT, a resident of Pittsburg, in the county of Allegheny, and THEODORE C. STEIMER, a resident of Charleroi, in the county of Washington, State of Pennsylvania, have invented a new and useful Improvement in Glass-Molds; and we do hereby declare the following to be a full, clear, and exact description thereof.

Our invention relates to the blowing of hollow glass articles in paste molds. These paste molds are employed only for the blowing of glassware which is truly circular in cross-section and which has generally been termed "cylindrical glass articles," though they often differ from true cylinders in the fact that they are of irregular shape in longitudinal section, as found in lamp-chimneys of different shapes having contracted necks, bulbs, or other enlargements or having tapering bodies. The articles are blown in paste molds, so as to form them "finless"—that is, free entirely from the fin formed at the joints of the glass-mold—*i. e.*, where the two sections of the mold come together—and the articles are formed in these molds without such fins by coating the interior face of the iron mold with paste, which supports a coating of carbonaceous material, such as pulverulent charcoal, and blowing the blank against such coating and revolving the blank during the process of blowing, so that no portion of the glass body rests against the mold-joint a sufficient length of time to form such fins. The revolving of the blanks during blowing has either been accomplished by a regular mechanical rotation thereof or by revolving it back and forth, or, as it might be termed, an "oscillation" thereof. This art of glass-making has required different conditions entirely from the ordinary class of glass blowing or pressing in molds where the glass comes directly in contact with the iron surface, as exemplified in the blowing or pressing of ornamented articles, bottles, &c. The universal practical use of such paste molds has been to dip them into water or spray water onto the paste surface after each blowing operation to cool the molds. The continual dipping or spraying of the mold gradually washes off the charcoal surfacing of the paste lining, leaving the sticky paste exposed to the hot glass, which destroys the paste, making it necessary to recoat the mold. Practice has shown it to be necessary to renew this paste lining after each turn, the paste being burned off and new paste applied before the next use of the mold. The labor of dipping the mold or wetting its paste surface has required the employment of an extra workman or the use of complicated mechanisms. We have discovered that these articles can be formed within the molds when dry by maintaining the mold by outside cooling below a heat which would char the paste surface and that in so doing much of the labor and complication of paste-mold blowing are overcome and the life of the paste surface extended, so that the objections to this art of glass-blowing are practically removed.

The invention therefore consists in making finless hollow glass articles circular in cross-section by blowing and revolving a hot blank against a dry paste surface within the mold and maintaining such paste surface below a charring heat by outside cooling.

To enable others skilled in the art to make and use our invention, we will describe the same more fully, referring to the accompanying drawings, in which—

Figure 3:
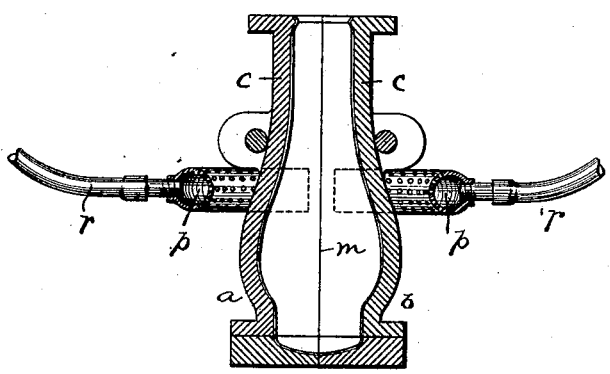

Figure 1 is a vertical cross-section of a paste mold employed in practicing the invention cooled by water circulation. Fig. 2 is a cross-section of the same, and Fig. 3 is a view of a like mold cooled by the employment of air-jets.

Like letters indicate like parts in each of the figures.

In the practice of our invention we may employ any suitable form of paste blow-mold which provides for the proper cooling of the walls of the mold by the application of cooling means to the outer surface of such walls.

The mold shown in Figs. 1 and 2 is an ordinary mold for the blowing of a lamp-chimney formed in two sections *a* and *b*. Each section of the mold is formed, as it were, as part of a cooling-box, so that when the two sections are closed together the mold proper is inclosed within a cooling-chamber. For this purpose the mold-sections have each in addition to their ordinary walls *c* the outer walls *e*, forming the chambers *f*. These chambers have suitable pipe connections by which any suitable cooling medium—such as water, cold air, &c.—can be carried through the same. For example, they have the inlet-pipes $g$, which extend, preferably, to the bottom of the molds, and the outlet-pipes $h$, leading from the top thereof, these two pipes having suitable hose connections by which the currents of water or air can be maintained within the cooling-chambers $f$. The mold-sections are shown as hinged together at $k$ and having suitable handles for operating the same at $l$. The only movement necessary for them is the horizontal opening and closing in order to insert the blow-blank in and withdraw the blown article from the same while it is supported upon the blowpipe. The interior walls of the blow-mold are truly circular in cross-section, as shown in Fig. 2, and there are necessarily the points of joining, as at $m$, in which fins would be formed in the ordinary way of mold-blowing in iron molds. The inner surfaces of the mold are, however, covered with a suitable paste, as above described, and for this purpose any kind of "paste" so called and used in the art may be employed. A paste well suited for the purpose is formed of boiled linseed-oil and rosin in suitable proportions, with which the blowing-surface of the mold is coated and over which pulverized charcoal is dusted to form a surface against which the blowing takes place.

The mold shown in Fig. 3 is the same in all essentials as that shown in Fig. 1, except that instead of employing a cooling-chamber through which the cooling medium is carried it is cooled by jets of air striking against the outer surfaces of the mold-walls, and for this purpose any suitable air-pipes are carried around the mold-sections at points about midway of the height thereof, as at $p$, these pipes being perforated, so as to project the air against the surface of the mold and so keep it cool. The air under pressure for this purpose can be carried to the mold by means of flexible pipes, as indicated at $r$.

In practicing the invention in the apparatus above described the glass is gathered on a suitable blowpipe, as shown at $s$, and after it is properly marvered and blown slightly to bring it into proper condition for blowing within the mold the blower inserts the blank within the mold and closes the mold around it, and as he blows the blank against the dry surface of the paste within the mold he rotates the blowpipe, so as to impart a like rotation to the blank while it is being enlarged within the mold, and in so doing he prevents the formation of any fin on the surface of the blown chimney, tumbler, or other article and brings the same to true cylindrical shape in cross-section. As soon as the article is blown the mold is opened and the article withdrawn therefrom and finished in the ordinary way. This blowing operation goes on steadily, the blanks being blown against the dry surface of the paste lining of the mold and the mold itself being maintained by the water or air cooling acting on the outside of the mold proper at a temperature below that at which this paste lining or surface will char. It has been found that but a slow current of water is required to keep the mold at such temperature, while by means of this current the paste lining can be held at the best temperature for blowing purposes, and the life of the paste can be extended many times beyond that of the life of paste in molds where the molds were dipped or the paste surface sprayed and so gradually washed off, as above described. At the same time all of the labor of dipping the molds is overcome, the only movement of the mold being the ordinary opening and closing, which can be performed by the blower, and therefore the cost of an extra workman in each shop or the use of complicated dipping or spraying means is done away with. In mechanical blowing the operation is practically the same, differing only in the fact that the article is rotated continuously instead of oscillated, as is the custom in hand-blowing. The articles produced in the practice of the method are found to have fine polished surfaces as smooth and perfect as produced in any paste-mold blowing, while it is also found that the blowing can proceed more rapidly and a larger number of articles per turn be produced.

What we claim as our invention, and desire to secure by Letters Patent, is—

1. The improvement in the art of making finless hollow glass articles circular in cross-section, consisting in blowing and revolving the hot blanks against a dry paste surface within the mold and maintaining such paste surface below charring-heat by outside cooling, substantially as set forth.

2. The improvement in the art of making finless hollow glass articles circular in cross-section, consisting in blowing and revolving the hot blanks against a dry paste surface within the mold, and maintaining such paste surface below charring-heat by a current of cooling fluid contacting with the outer surface of the mold-body, substantially as set forth.

In testimony whereof we, the said CHRISTIAN Z. F. ROTT and THEODORE C. STEIMER, have hereunto set our hands.

CHRISTIAN Z. F. ROTT.
THEODORE C. STEIMER.

Witnesses:
T. P. GRANT,
ANDREW C. MCKEAN.